United States Patent
Matsuda

(10) Patent No.: US 8,760,564 B2
(45) Date of Patent: Jun. 24, 2014

(54) TERMINAL DEVICE AND CONTROL METHOD

(75) Inventor: Munehito Matsuda, Daito (JP)

(73) Assignee: KYOCERA Corporation, Kyoto (JP)

(*) Notice: Subject to any disclaimer, the term of this patent is extended or adjusted under 35 U.S.C. 154(b) by 80 days.

(21) Appl. No.: 13/091,421

(22) Filed: Apr. 21, 2011

(65) Prior Publication Data

US 2011/0261220 A1    Oct. 27, 2011

(30) Foreign Application Priority Data

Apr. 26, 2010  (JP) ................................ 2010-100865

(51) Int. Cl.
*H04N 5/232*     (2006.01)

(52) U.S. Cl.
USPC .......................................... 348/345; 348/349

(58) Field of Classification Search
USPC ......................................................... 348/345
See application file for complete search history.

(56) References Cited

U.S. PATENT DOCUMENTS

| | | | |
|---|---|---|---|
| 2005/0088538 A1 | 4/2005 | Nozaki et al. | |
| 2008/0317455 A1* | 12/2008 | Abe | 396/263 |
| 2009/0322935 A1* | 12/2009 | Yamasaki | 348/349 |

FOREIGN PATENT DOCUMENTS

| | | |
|---|---|---|
| JP | 2005-117530 A | 4/2005 |
| JP | 2009-171301 A | 7/2009 |

OTHER PUBLICATIONS

Office Action dated Dec. 10, 2013, issued in counterpart Japanese application No. 2010-100865.

* cited by examiner

*Primary Examiner* — Twyler Haskins
*Assistant Examiner* — Angel L Garces-Rivera
(74) *Attorney, Agent, or Firm* — Procopio, Cory, Hargreaves & Savitch LLP

(57) ABSTRACT

It is an object of the present invention to provide a photograph-taking terminal device that offers users improved convenience. The terminal device includes a face detection unit configured to detect human faces in image consecutively generated by photography, a focusing mechanism configured to focus for photography, and a control unit configured to control the focusing mechanism. After the face detection unit begins detection operations, the first time a face is detected, the control unit instructs the focusing mechanism to focus. After focusing, the control unit prevents the focusing mechanism from focusing again until the face detection unit no longer detects any face. After a face is detected anew, the control unit instructs the focusing mechanism to focus again.

13 Claims, 6 Drawing Sheets

TERMINAL DEVICE AND CONTROL METHOD

This application is based on an application No. 2010-100865 filed in Japan, the contents of which are hereby incorporated by reference.

TECHNICAL FIELD

The present invention relates to focusing during photography by a terminal device provided with a camera function.

BACKGROUND ART

In recent years, terminal devices provided with a camera function that includes a face recognition feature have appeared.

At the time of photography, when detecting the face of a subject via face recognition, the terminal device automatically focuses on the detected face and then takes a photograph.

Patent Literature 1 discloses technology by which a camera function provided with a face recognition feature focuses on a face. In Patent Literature 1, at the time of photography of a subject, when detecting the face of the subject, the terminal device automatically focuses on the detected face and locks the focus. If the position of the subject changes due to the subject subsequently moving, the terminal device unlocks the focus.

CITATION LIST

Patent Literature

[Patent Literature 1] Japanese Patent Application Publication No. 2009-171301

SUMMARY OF INVENTION

Technical Problem

In Patent Literature 1, if for example the subject is positioned near the center of the field of view, the subject is focused on at this position. Subsequently, before closing the shutter, if the direction of the camera is changed, i.e. if the position of the subject moves from the center to the right due to a change in the direction of photography, the focus is unlocked. Face recognition is performed again at the location that has shifted to the right, and the subject is focused on again. Therefore, each time the subject moves in a photographable image frame due to a change in the direction of photography, refocusing occurs, which is unpleasant for the user. Such refocusing each time the direction of photography changes is unpleasant because the user cannot close the shutter until the refocusing is complete, and also because if the user does close the shutter in the midst of focusing, the resulting image is out of focus.

Furthermore, when photographing a plurality of people, as in a group photo, and a certain person's face is detected and focused on, a different face may be detected when the focus is unlocked due to camera movement or the like. This different face is then focused on.

In such cases, focusing occurs frequently, which may inconvenience the user.

It is therefore an object of the present invention to provide a photograph-taking terminal device and control method that offer users improved convenience.

Solution to Problem

To achieve the above object, the present invention is a terminal device comprising: a face detection unit configured to detect a human face in an image; a focusing mechanism configured to focus on the detected face; and a control unit configured to control the focusing mechanism, wherein when the face detection unit detects the face after a state in which no face is detected, the control unit instructs the focusing mechanism to focus and prevents the focusing mechanism from focusing again until the face detection unit no longer detects a face.

Advantageous Effects of Invention

With this structure, the terminal device prevents focusing after the face detection unit detects a face until a face is no longer detected. This offers users improved convenience when taking photographs.

DESCRIPTION OF EMBODIMENTS

1. Embodiment 1

The following describes a mobile phone as an embodiment of a terminal device according to the present invention.

1.1 Outline

Figure 1A:
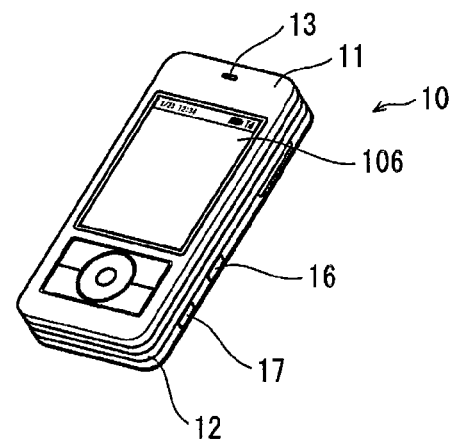
FIGS. 1A, 1B, and 1C show the outward appearance of a mobile phone 10.
Figure 1B:
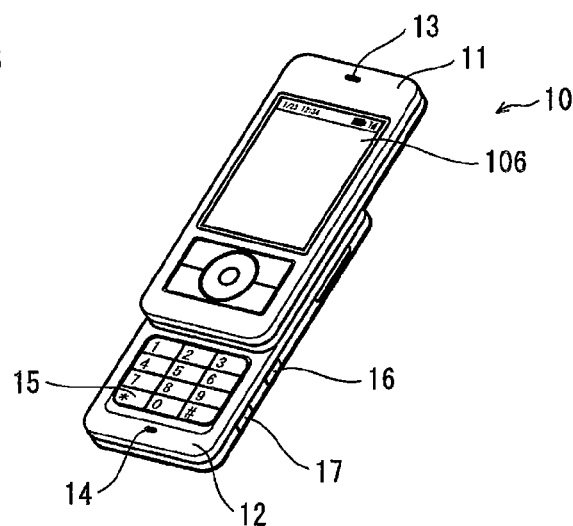
Figure 1C:
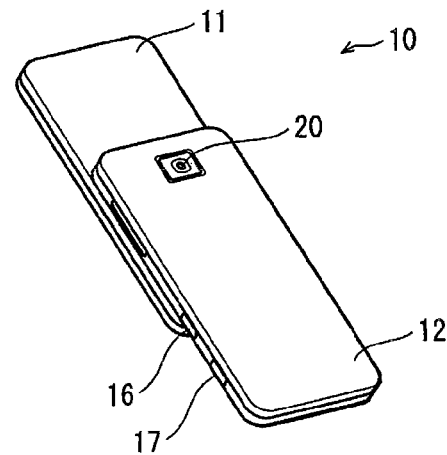

A terminal device is, for example, a mobile phone provided with a camera. The outward appearance of such a terminal device is described with reference to FIGS. 1A-1C. FIG. 1A is a perspective view of a mobile phone 10 in Embodiment 1 in a closed position, and FIG. 1B is a perspective view of the mobile phone 10 in an open position. FIG. 1C is a back view of the mobile phone 10 in the closed position.

The mobile phone 10 is provided with two housings, 11 and 12. The housing 11 is slid with respect to the housing 12 to open and close the mobile phone 10.

A display unit 106, which includes a liquid crystal display (hereinafter, LCD) or the like, and a speaker unit 13 are provided in the housing 11.

A microphone 14 and a key unit 15 are provided in the housing 12. Key units 16 and 17 are provided on a side of the housing 12, and a camera lens 20 is provided on the back of the housing 12.

When using the camera for photography, the mobile phone 10 displays subjects appearing in the camera lens 20 on the display unit 106, and images are captured by, for example, pressing the key unit 16.

The mobile phone 10 is provided with a face detection function and focuses on a face detected at the time of photography. Subsequently, as long as the face continues to be detected, the mobile phone 10 does not refocus. After the face is no longer detected, when a face is detected anew, the mobile phone 10 refocuses.

Photography by the mobile phone 10 includes regular photography and smile photography. Regular photography refers to taking a photograph when the key unit 16 is pressed. Smile photography refers to automatically taking a photograph when a smile is detected in a face that is detected by the face detection function. That is, smile photography automatically saves an image during smile detection.

The following describes the function of focusing during regular photography and smile photography.

1.2 Structure

The following describes the structure related to the function to focus during regular photography and smile photography in the mobile phone 10.

Figure 2:
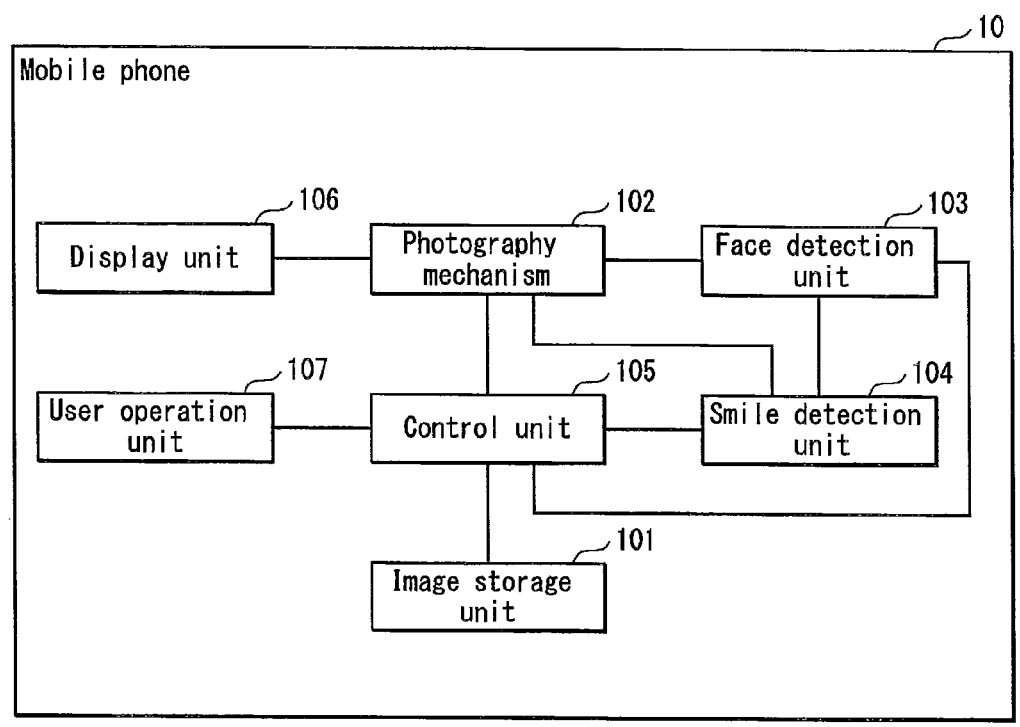
FIG. 2 is a block diagram showing constituent elements related to a regular photography function and a smile photography function in the mobile phone 10.

As shown in FIG. 2, the mobile phone 10 includes an image storage unit 101, a photography mechanism 102, a face detection unit 103, a smile detection unit 104, a control unit 105, a display unit 106, and a user operation unit 107.

FIG. 2 only shows the constituent elements of the mobile phone 10 related to the function to focus during regular photography and smile photography in the mobile phone 10. The mobile phone 10 is also provided with constituent elements for implementing the functions of a mobile phone, including constituent elements related to other photography functions, to communications functions, etc.

(1) Image Storage Unit 101

The image storage unit 101 has a region for storing images captured by the regular photography and smile photography functions.

(2) Photography Mechanism 102

The photography mechanism 102 is provided with a camera lens 20 and mechanisms for focus, zoom, and diaphragm shutter control. Photographs are taken through the operations of these mechanisms.

The mechanism for focusing focuses on a subject that is captured (photographed) by the camera lens 20 based on a face detected by the face detection unit 103 described below. Specifically, distance measurement is performed on a central location of a detected face region via a passive method. A passive method refers to measuring distance using natural light by successively changing the focal distance from infinity to macro (for example, 10 cm) and seeking the optimal focal distance. The photography mechanism 102 specifies the focal distance, among a plurality of focal distances measured via the passive method, at which a detected face is the sharpest.

(3) Face Detection Unit 103

The face detection unit 103 detects faces from among subjects captured by the camera lens 20. Specifically, the face detection unit 103 stores sample images of human faces in advance and detects faces by matching the sample images with the subjects captured by the camera lens 20.

Note that facial detection is well-known technology, and therefore a description thereof is omitted.

In the present Embodiment, the face detection unit 103 is capable of detecting up to four people's faces, and face detection is performed regardless of operations by the photography mechanism 102 in either regular photography or smile photography.

(4) Smile Detection Unit 104

The smile detection unit 104 operates during smile photography and detects a degree of smile in each face detected by the face detection unit 103. Specifically, the smile detection unit 104 stores sample images for characteristic locations of a smiling face (such as the mouth, the inner and outer corners of the eyes, etc.) in advance. The smile detection unit 104 specifies the position of a photographed face based on the position of the face detected by the face detection unit 103. The smile detection unit 104 compares sample images of the characteristic locations of a smiling face with the corresponding locations in the identified face, thus acquiring a degree of matching (degree of smile). In this embodiment, the degree of smile is set to an integer from 0 to 100. For example, the higher the value of the degree of smile, the more the person in the photograph is smiling, with a degree of smile of 100 representing a broad grin.

Note that when the face detection unit 103 detects a plurality of faces, the smile detection unit 104 acquires the degree of smile for each detected face.

(5) Control Unit 105

The control unit 105 controls overall operations in the mobile phone 10.

The following describes functions used during regular photography and functions used during smile photography.

(5-1) During Regular Photography

The control unit 105 monitors whether the face detection unit 103 has detected a face. The control unit 105 controls operation of the focusing mechanism in the photography mechanism 102 using a monitoring flag. The monitoring flag is a value indicating whether the face detection unit 103 has detected a face. A value of "0" indicates that no face has been detected, whereas a value of "1" indicates that a face has been, and continues to be, detected.

When the value of the monitoring flag is 0 and the control unit 105 detects that the face detection unit 103 has detected a face, the control unit 105 changes the value of the monitoring flag to 1 and causes the photography mechanism 102 to focus.

As long as the value of the monitoring flag is 1, that is, as long as the face detection unit 103 continues to detect a face, the control unit 105 prevents the photography mechanism 102 from focusing.

When the value of the monitoring flag is 1 and the control unit 105 detects that the face detection unit 103 no longer detects a face, the control unit 105 changes the value of the monitoring flag to 0.

Furthermore, when the user presses the key unit 16 (i.e. closes the shutter), the control unit 105 causes the image captured by the camera lens 20 at that point to be saved in the image storage unit 101.

The control unit 105 sets the value of the monitoring flag to 0 when the camera boots up and when an image is saved in the image storage unit 101.

Regardless of an increase or decrease in the number of faces the face detection unit 103 detects, as long as at least one face is detected, that is as long as the number of detected faces is not zero, the control unit 105 determines that a face continues to be detected and leaves the value of the monitoring flag as 1.

(5-2) During Smile Photography

The control unit 105 monitors whether the face detection unit 103 detects a face. Depending on the status of detection, the control unit 105 controls focusing by the photography mechanism 102. During smile photography as well, the control unit 105 uses a monitoring flag to control focusing by the photography mechanism 102, as during regular photography. Control of focusing the monitoring flag is described above, for which reason an explanation thereof is omitted here.

During smile photography, when the degree of smile detected by the smile detection unit 104 is at least a predetermined threshold (for example, 45), the control unit 105 causes the image captured by the camera lens 20 at that point to be saved in the image storage unit 101. In other words, the shutter closes automatically, and the image at that point is saved. In the present Embodiment, when a plurality of faces has been detected, the shutter automatically closes when the smile on one of the faces is at least a predetermined threshold.

(6) Display Unit 106

Before photography, the display unit 106 displays a subject that is captured (photographed) by the camera lens 20. If the face detection unit 103 detects a face at this point, a frame is also displayed surrounding the detected face.

(7) User Operation Unit 107

The user operation unit 107 includes key units 15, 16, and 17 and has the function of receiving instructions from the user. Specifically, the user operation unit 107 receives a save instruction (pressing of the key unit 16) to save an image during regular photography. The user operation unit 107 also receives an instruction to switch between regular photography and smile photography.

1.3 Operations

The following describes regular photography and smile photography in the mobile phone 10.

(1) Operations During Regular Photography

Figure 3:
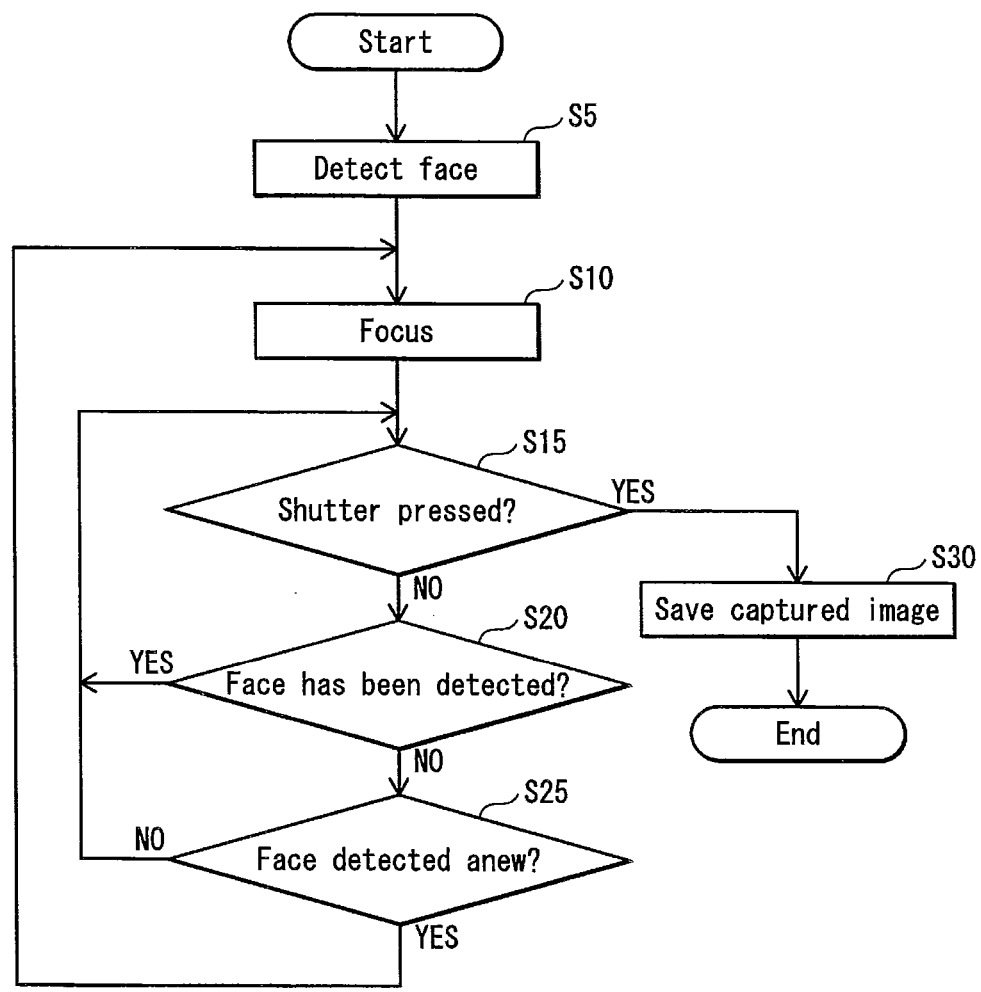
FIG. 3 is a flowchart showing processing by the mobile phone 10 during regular photography.

First, operations during regular photography are described with reference to the flowchart in FIG. 3.

The face detection unit 103 detects a face from among subjects captured (photographed) by the camera lens 20 (step S5).

When the face detection unit 103 detects a face, the focus mechanism of the photography mechanism 102 focuses based on the detected face (step S10). Specifically, when the value of the monitoring flag is 0 and the control unit 105 detects that the face detection unit 103 has detected a face, the control unit 105 causes the photography mechanism 102 to perform operations to focus.

The control unit 105 determines whether the shutter has been closed, i.e. whether the key unit 16 has been pressed (step S15).

When determining that the key unit 16 has been pressed (step S15: YES), the control unit 105 saves the image captured by the camera lens 20 at that point in the image storage unit 101 (step S30).

When determining that the key unit 16 has not been pressed (step S15: NO), the control unit 105 determines whether the face detection unit 103 has detected a face (step S20). When it is determined that the face detection unit 103 has detected a face (step S20: YES), processing returns to step S15. When determining that the face detection unit 103 has not detected a face (step S20: NO), the control unit 105 determines whether the face detection unit 103 has detected a face anew (step S25). When it is determined that a face has been detected anew (step S25: YES), processing returns to step S10. When it is determined that a face has not been detected anew (step S25: NO), processing returns to step S15.

With the above processing, when the face of a subject is detected during regular photography via the camera function, the focus that is set in step S10 is fixed from the time the face is detected until a face is no longer detected. The camera focuses again when a face is once again detected. Regardless of whether the subject moves while a face continues to be detected, an image is saved at the fixed focus when the shutter is closed.

(2) Operations During Smile Photography

Figure 4:
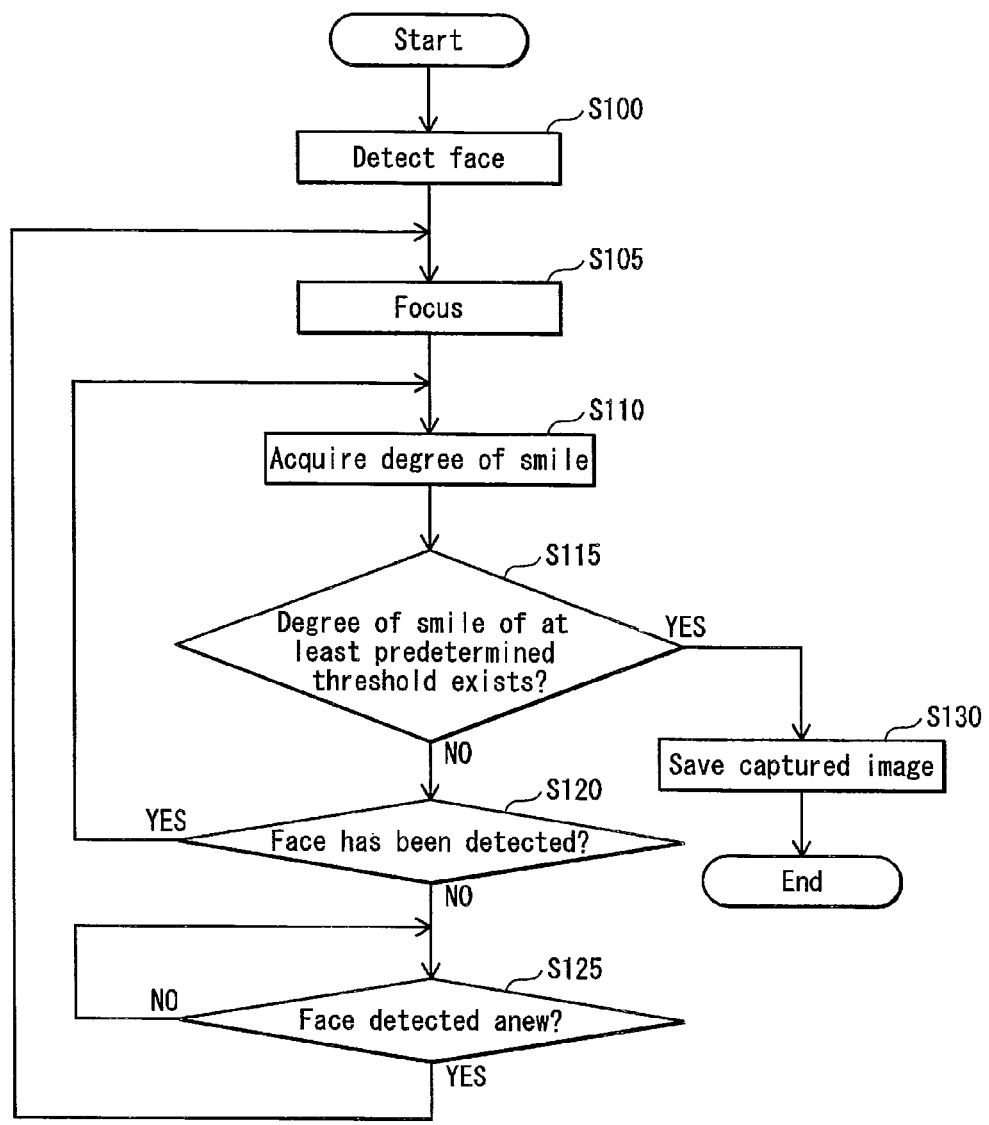
FIG. 4 is a flowchart showing processing by the mobile phone 10 during smile photography.

First, operations during smile photography are described with reference to the flowchart in FIG. 4.

The face detection unit 103 detects a face from among subjects captured (photographed) by the camera lens 20 (step S100).

When the face detection unit 103 detects a face, the focus mechanism of the photography mechanism 102 focuses based on the detected face (step S105). Specifically, when the value of the monitoring flag is 0 and the control unit 105 detects that the face detection unit 103 has detected a face, the control unit 105 causes the photography mechanism 102 to perform operations to focus.

The smile detection unit 104 acquires a degree of smile in the detected face (step 110). When the face detection unit 103 detects a plurality of faces, the smile detection unit 104 acquires the degree of smile for each detected face.

The control unit 105 determines whether a degree of smile that is at least a predetermined threshold exists (step S115).

When determining that a degree of smile that is at least a predetermined threshold exists (step S115: YES), the control unit 105 saves the image captured by the camera lens 20 at that point in the image storage unit 101 (step S130).

When determining that a degree of smile that is at least a predetermined threshold does not exist (step S115: NO), the control unit 105 determines whether the face detection unit 103 has detected a face (step S120). When it is determined that the face detection unit 103 has detected a face (step S120: YES), processing returns to step S110. When determining that the face detection unit 103 has not detected a face (step S120: NO), the control unit 105 waits for the face detection unit 103 to detect a face anew (step S125). Specifically, while the face detection unit 103 has not detected a face anew (step S125: NO), the control unit 105 repeats the processing in step S125. When it is determined that the face detection unit 103 has detected a face anew (step S125: YES), processing returns to step S105.

With the above processing, when the face of a subject is detected during smile photography via the camera function, the focus that is set in step S105 is fixed from the time the face is detected until a face is no longer detected. Focusing is performed again when a face is once again detected. Regardless of whether the subject moves while a face is detected, when a degree of smile that is at least a predetermined threshold exists (i.e. is detected), an image is saved at the fixed focus when the shutter closes automatically.

1.4 Specific Examples

The following describes processing from face detection until an image is saved using specific examples.

(1) Regular Photography

Figure 5:
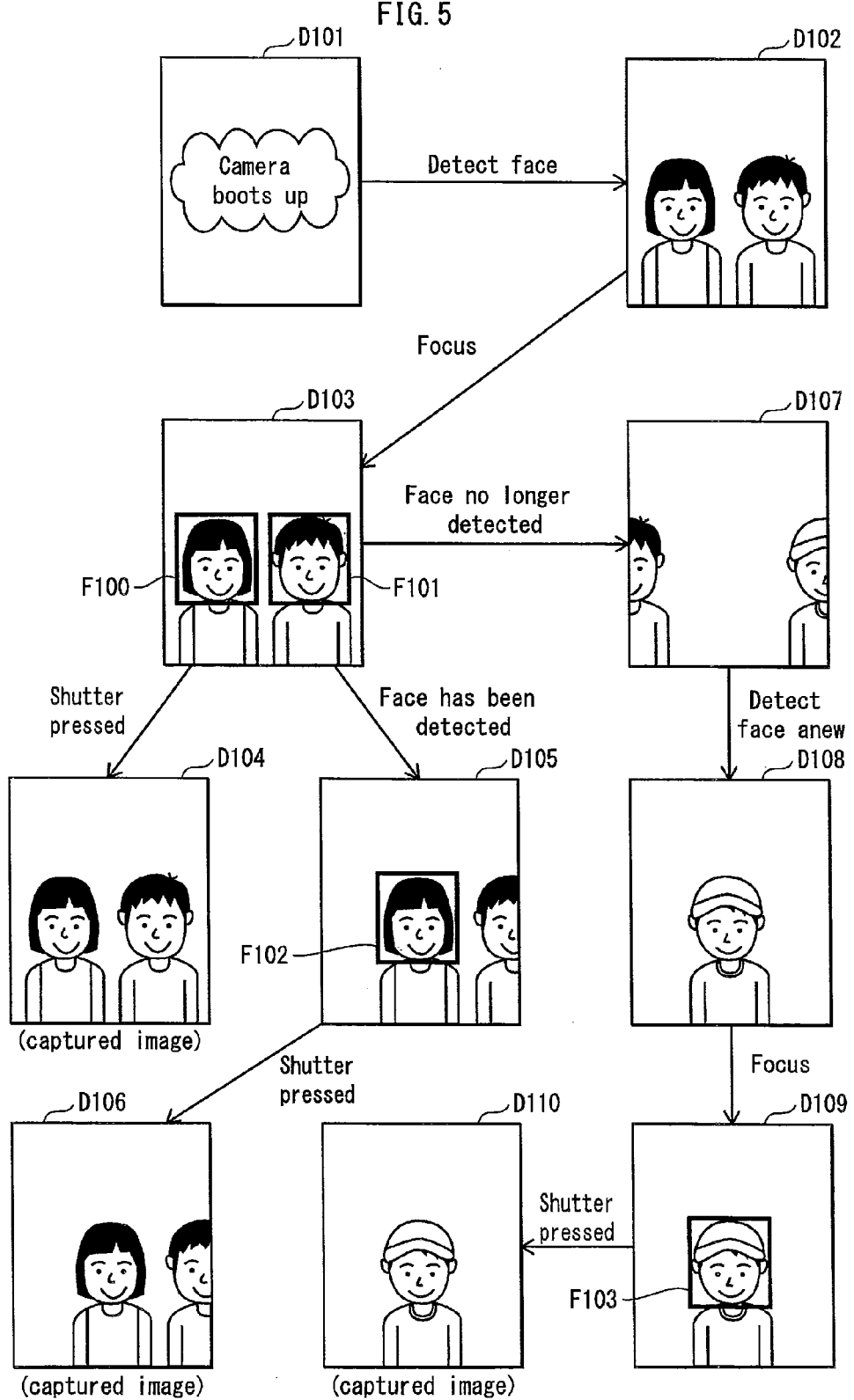
FIG. 5 shows an example of processing until an image is saved during regular photography.

With reference to FIG. 5, the following describes processing during regular photography from detection through saving of an image, based on changes in the screen displayed by the display unit 106.

When the camera function boots up (see the screen D101), the face detection unit 103 performs face detection. Faces as shown in the image D102 are detected, the camera focuses, and the detected faces are displayed respectively surrounded by frames F100 and F101 as shown in the image D103.

Subsequently, when the shutter is closed (i.e. when the key unit 16 is pressed), the image at that point is saved (see the image D104).

After the image D103 is displayed, as long as at least one face is detected and the shutter is not closed, i.e. as long as detection of a face continues, the camera does not focus, and in the image D105, a frame F102 is attached to the face that is detected. If the shutter is closed (i.e. the key unit 16 is pressed) under the conditions shown in the image D105, the image at that point is saved (see the image D106).

After the image D103 is displayed, if the direction of photography changes so that a face is no longer detected and face detection is performed anew (see the images D107 and D108), then refocusing occurs. A face that is detected anew is displayed with a frame F103 attached thereto, as in the image D109. If the shutter is closed (i.e. the key unit 16 is pressed) under the conditions shown in the image D109, the image at that point is saved (see the image D110).

As clearly described with reference to FIG. 5, the camera focuses when a face is first detected after a state in which a face has not been detected, and thereafter, as long as a face continues to be detected, the camera does not focus again regardless of movement by the subject. Once the camera has focused, an image captured at the set focus is saved regardless of movement by the subject as long as a face continues to be detected.

Note that the transition from the image D103 to the image D105 in FIG. 5, i.e. the transition between images while a face continues to be detected, shows an example in which the number of detected faces goes from two to one. However, when the number of detected faces increases, the camera similarly does not refocus.

(2) Smile Photography

Figure 6:
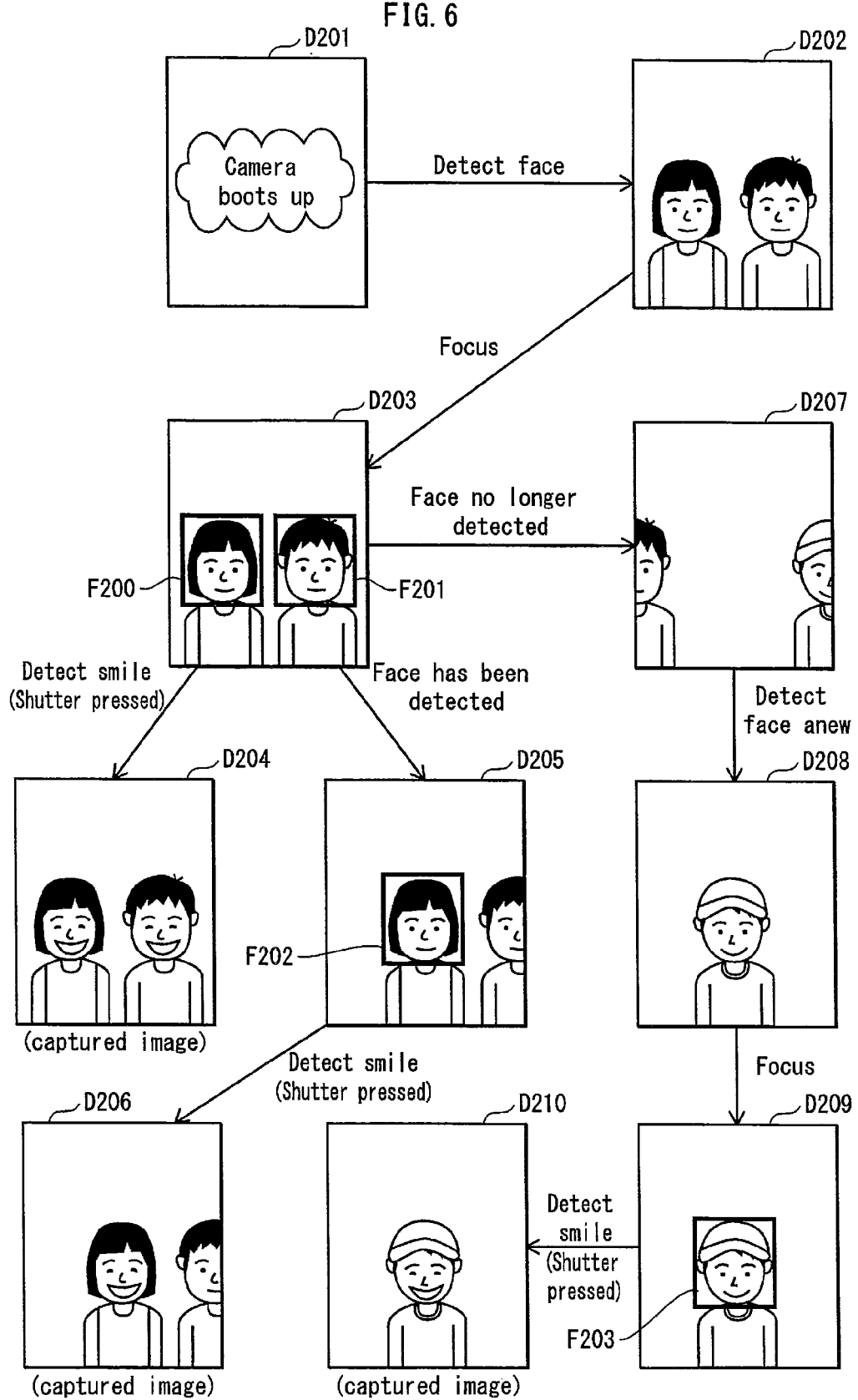
FIG. 6 shows an example of processing until an image is saved during smile photography.

With reference to FIG. 6, the following describes processing during smile photography from detection through saving of an image, based on changes in the screen displayed by the display unit 106.

When the camera function boots up (see the screen D201), the face detection unit 103 performs face detection. Faces as shown in the image D202 are detected, the camera focuses, and the detected faces are displayed respectively surrounded by frames F200 and F201 as shown in the image D203.

Subsequently, when a smile having a degree of smile equal to at least a predetermined threshold is detected, the image at that point is saved (see the image D204).

After the image D203 is displayed, as long as at least one face is detected and no smile is detected, i.e. as long as detection of a face is maintained, the camera does not focus, and in the image D205, a frame F202 is attached to the face that is detected. Subsequently, under the conditions shown in the image D205, when a smile having a degree of smile equal to at least a predetermined threshold is detected, the image at that point is saved (see the image D206).

After the image D203 is displayed, if the direction of photography changes so that a face is no longer detected and face detection is performed anew (see the images D207 and D208), then refocusing occurs. A face that is detected anew is displayed with a frame F203 attached thereto, as in the image D209. Subsequently, under the conditions shown in the image D209, when a smile having a degree of smile equal to at least a predetermined threshold is detected, the image at that point is saved (see the image D210).

As clearly described with reference to FIG. 6, the camera focuses when a face is first detected after a state in which a face has not been detected, and thereafter, as long as a face continues to be detected, the camera does not focus again regardless of movement by the subject. Once the camera has focused, regardless of movement by the subject while a face continues to be detected, an image captured at the set focus is saved when a smile having a degree of smile at least equal to a predetermined threshold is detected.

Note that the transition from the image D203 to the image D205 in FIG. 6, i.e. the transition between images while a face continues to be detected, shows an example in which the number of detected faces goes from two to one. However, when the number of detected faces increases, the camera similarly does not refocus.

1.5 Modifications

An embodiment of the present invention has been described, but the present invention is not limited to the above embodiment. For example, the following modifications are possible.

(1) In Embodiment 1, the threshold of the degree of smile for an image to be automatically saved during smile photography is 45, but the threshold is not limited in this way.

The threshold of the degree of smile may be a different value.

(2) In Embodiment 1, a maximum of four faces are detected, but the maximum number is not limited in this way.

The maximum number of faces detected may be five or greater.

(3) In Embodiment 1, the mobile phone 10 is a sliding model, but the mobile phone 10 is not limited in this way. The mobile phone 10 may be folding, or may be a "straight" shape without moving or sliding parts. In other words, the shape of the mobile phone 10 is not limited, as long as the mobile phone 10 is provided with a camera function.

(4) In Embodiment 1, the camera refocuses after initially focusing when a face is no longer detected and is then detected anew, but the present invention is not limited in this way.

A set focus may be unlocked via user operation, and the camera may then refocus.

(5) In Embodiment 1, focusing is performed via the passive method, but focusing is not limited in this way.

Focusing may be performed by an active method.

(6) The above Embodiments and Modifications may be combined with one another.

1.6 Supplementary Explanation (1) To achieve the above object, the present invention is a terminal device comprising: a face detection unit configured to detect a human face in an image; a focusing mechanism configured to focus on the detected face; and a control unit configured to control the focusing mechanism, wherein when the face detection unit detects the face after a state in which no face is detected, the control unit instructs the focusing mechanism to focus and prevents the focusing mechanism from focusing again until the face detection unit no longer detects a face.

With this structure, the terminal device prevents focusing after the face detection unit detects a face until a face is no longer detected. This offers users improved convenience when taking photographs.

(2) Upon being instructed to focus by the control unit, the focusing mechanism may focus by successively changing a focal distance with respect to the face detected by the face detection unit in order to specify the focal distance at which the face is sharpest.

With this structure, the terminal device specifies the focal distance at which the detected face is sharpest, thus generating an image with a sharp subject.

(3) The terminal device may further comprise a smile detection unit configured to detect a smile in a face detected by the face detection unit, wherein the control unit is further configured to store, when the smile detection unit detects the smile in the face after the focusing mechanism focuses, the image in which the smile is detected in a predetermined storage area.

With this structure, when a smile is detected after focusing, the terminal device saves the image with the detected smile, thus saving an image in which the subject has an optimal facial expression.

(4) The face detection unit may detect any number of faces in the image, and the control unit may further be configured to determine whether the face detection unit detects the face in accordance with whether the face detection unit detects at least one face.

With this structure, the control unit of the terminal device determines that a face has been detected when the face detection unit detects at least one face. Accordingly, a state in which a face has been detected continues even when the number of detected faces changes, thereby offering users improved convenience even when photographing a plurality of people.

INDUSTRIAL APPLICABILITY

The present invention is useful in terminal devices having a camera function.

REFERENCE SIGNS LIST 10 mobile phone
11, 12 housing
13 speaker
14 microphone
15, 16, 17 key units
20 camera lens
101 image storage unit
102 photography mechanism
103 face detection unit
104 smile detection unit
105 control unit
106 display unit
107 user operation unit

The invention claimed is:

1. A terminal device comprising:
a face detection unit configured to detect one or more human faces in a field of view of a camera;
a focusing mechanism configured to focus on the detected one or more human faces;
a control unit configured to, when the face detection unit detects the one or more human faces after a state in which no human face is detected,
instruct the focusing mechanism to focus based on the detected one or more human faces, and,
after completion of the focusing based on the detected one or more human faces, prevent the focusing mechanism from refocusing for as long as the face detection unit detects at least one human face, regardless of whether one or more of the detected one or more human faces change position with respect to the field of view, and allow the focusing mechanism to refocus if the face detection unit no longer detects at least one human face.

2. The terminal device of claim 1, wherein upon being instructed to focus by the control unit, the focusing mechanism focuses by successively changing a focal distance with respect to at least one of the one or more human faces detected by the face detection unit in order to specify the focal distance at which the at least one human face is sharpest.

3. The terminal device of claim 2, further comprising:
a smile detection unit configured to detect a smile in a human face detected by the face detection unit, wherein the control unit is further configured to, when the smile detection unit detects a smile in one or more of the one or more human faces after the focusing mechanism focuses, store an image of the field of view in which the smile is detected in a storage area.

4. The new terminal device of claim 3, wherein the smile detection unit if further configured to:

compute a value indicating a degree of smile for each of the detected one or more human faces; and
automatically store the image of the field view when the value computed for at least one of the detected one or more human faces satisfies a predetermined threshold.

5. The terminal device of claim 1, wherein:
the face detection unit detects any number of faces in the image, and
the control unit is further configured to determine whether the face detection unit detects the face in accordance with whether the face detection unit detects at least one face.

6. The terminal device of claim 1, further comprising a display unit configured to display an image of the field of view and one or more frames surrounding the detected one or more human faces in the image.

7. The terminal device of claim 6, wherein the control unit is further configured to instruct the display unit to display the one or more frames only after completion of the focusing based on the detected one or more human faces.

8. The terminal device of claim 1, wherein control unit is further configured to:
when no human face is detected by the face detection unit, set a flag to a first value;
when at least no human face is detected by the face detection unit, set the flag to a second value; and,
as long as the flag is set to the second value, prevent the focusing mechanism from refocusing.

9. The terminal device of claim 1, wherein the control unit is configured to, after completion of the focusing based on the detected one or more human faces, prevent the focusing mechanism from refocusing for as long as the face detection unit detects at least one human face and a shutter of the camera is not closed.

10. The terminal device of claim 1, wherein the control unit is configured to, after completion of the focusing based on the detected one or more human faces, prevent the focusing mechanism from refocusing for as long as the face detection unit detects at least one human face, a shutter of the camera is not closed, and focus is not unlocked by a user operation.

11. A control method used in a terminal device provided with a focusing mechanism configured to focus, the control method comprising:
detecting one or more human faces in a field of view of a camera;
controlling the focusing mechanism to focus on the dected one or more human faces; and,
when the one or more human faces are detected after a state in which no human face is detected, controlling the focusing mechanism to focus based on the detected one or more human faces, and, after completion of the focusing based on the detected one or more human faces, preventing the focusing mechanism from focusing for as long as at least one human face is detected, regardless of whether one or more of the detected one or more human faces change position with respect to the field of view, and allowing the focusing mechanism to refocus if at least one human face is no longer detected.

12. The control method of claim 11, further comprising displaying an image of the field of view and one or more frames surrounding the detected one or more human faces in the image.

13. The control method of claim 12, further comprising displaying the one or more frames only after completion of the focusing based on the detected one or more human faces.

* * * * *